Nov. 1, 1932.  I. W. WATERVAL  1,885,647
RECEPTACLE ACTUATED FAUCET
Filed June 9, 1931
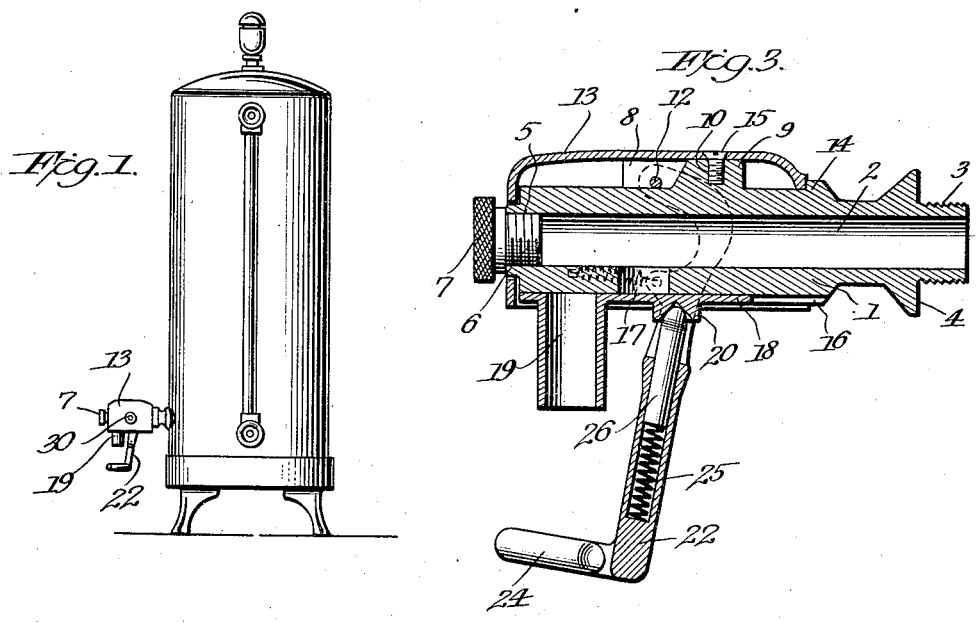
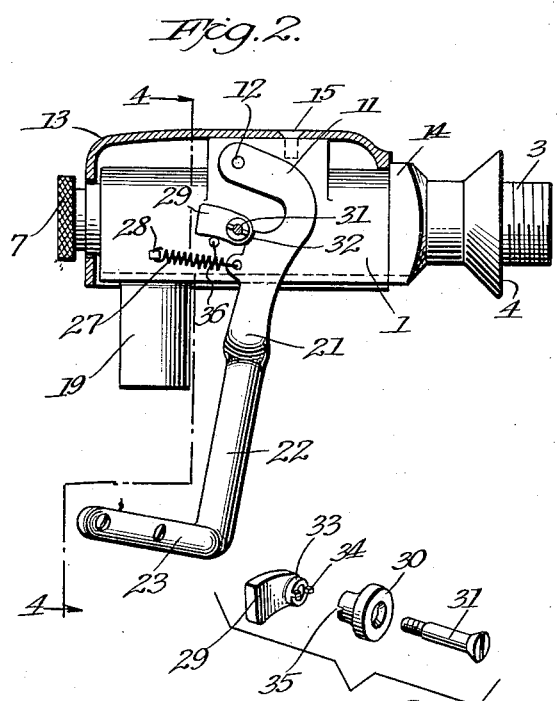
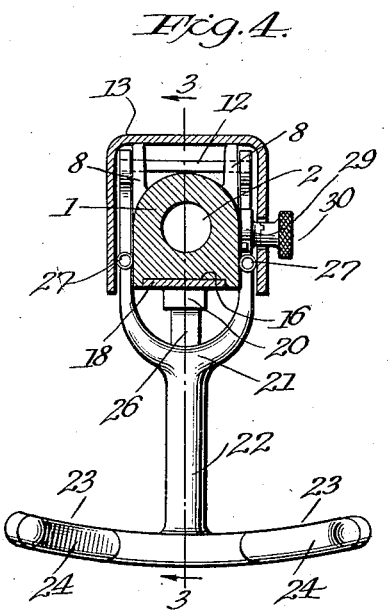
Inventor
Ivar W. Waterval,
By Cushman Bryant Henry
Attorneys Patented Nov. 1, 1932

1,885,647

UNITED STATES PATENT OFFICE

IVAR W. WATERVAL, OF EVANSTON, ILLINOIS

RECEPTACLE ACTUATED FAUCET

Application filed June 9, 1931. Serial No. 543,224.

The invention relates to a receptacle actuated faucet.

In faucets of the type designated, and particularly the valve structure thereof, there have been found disadvantages in their operativeness and in their adaptability to certain purposes.

In the disclosure of my invention, I have illustrated the faucet as used in connection with the ordinary coffee dispensing urn, and it is clearly understood that the faucet is not limited to this particular use, but is adaptable to innumerable other requirements.

Where receptacle actuated faucets have been heretofore used, for instance with coffee urns, they have been found to function improperly because of a tendency to become coated or clogged with coffee grounds or other foreign deposits, and at times inoperative. This is occasioned by the lack of proper provisions made to thoroughly clean the faucet and valve structure which usually requires complete dismantling. Obviously, the question of sanitation of devices of this type is a great importance.

Further objection has been registered due to the lack of coordination between the actuating lever and the spout of the faucet due to the fact that the spout does not follow the receptacle to be filled, but is stationary and so positioned that the receptacle moves relative to the spout.

With these and other objectionable features of the present-day faucets in mind, I have devised a structure which not only overcomes the aforementioned difficulties, but affords various advantages which will be favorably recognized by those familiar with the art.

One of the objects of my invention is to provide a receptacle actuated faucet which can be thoroughly cleaned at any time without dismantling the structure in order to distinctly aid in operativeness of the device and to further enhance the sanitary facilities thereof.

Another object of my invention is to provide a receptacle actuated faucet which in operation eliminates the usual tendency to spill or waste attendant to the devices of this type.

Another object of my invention is to provide a receptacle actuated faucet, the operating parts of which are very accessible in case repairs or replacements are ever necessary.

Still another object of my invention is to provide a receptacle actuated faucet which is simple in construction, inexpensive to manufacture and of lasting quality.

With these and other objects and advantages in mind, attention is directed to the drawing, in which:

Figure 1 is an elevational view of the receptacle actuated faucet attached to the ordinary coffee dispensing urn.

Figure 2 is a side view of the receptacle actuated faucet with the hood or outside casing in section showing the actuating lever and associated parts.

Figure 3 is a longitudinal sectional view of the device taken on the line 3—3 of Figure 4, looking in the direction of the arrows.

Figure 4 is a cross sectional view of the device taken on the line 4—4 of Figure 2.

Figure 5 is a perspective view of the parts forming the locking means for positioning the actuating lever.

Referring more particularly to the drawing, in which like numbers indicate like parts, 1 is the body portion of the valve through the entire length of which extends the passage 2 open at both ends. One end of said body portion is screw threaded externally at 3 for attachment to the container from which the liquid is to be drawn and has the usual boss or shouldered member 4 adjacent thereto. The other end of the body portion is screw-threaded internally within the passage at 5 to accommodate the shank 6 of the stopper which is provided with the knurled head 7.

At the top of the body portion the sides project upwardly at 8 and between such projections is a protuberance 9 having therein a screw threaded aperture 10. To the projections 8 is pivoted the lever actuating member 11 in any suitable way, as by a rod 12. A hood or casing 13 is positioned on the body portion and abuts at one end against the shouldered member or boss 14 and is provided with an aperture at the other end to allow insertion of the stopper into the passage of the body portion. The hood or casing is attached to the body portion by means of the screw bolt 15 in the aperture 10.

On the bottom or underside of the body portion is a valve seat 16 and extending through the body portion from the passage 2 into the valve seat is an aperture 17.

Positioned in the valve seat for movement therein is a sliding valve member 18. A spout 19 is integral with the sliding valve member or obviously may be secured thereto in any suitable manner in order that the spout will move with said sliding valve member. A socket-like projection 20 is attached to the underside of the sliding valve member.

The actuating lever comprises a substantially U-shaped member 21, the arms of which, as stated before, are pivoted to the projections 8 in any suitable way, as by the rod 12. The extension 22 of the lever has at its lower end the curved arms 23 provided with buffers 24 to receive the receptacle to be filled. The said extension 22 is hollow and therewithin is a spring 25 and a dog 26, the upper end of which is round and projects into and rocks within the socket 20 on the bottom of the sliding valve member. It will be observed that the dog 26 and spring 25 support the sliding valve member within the valve seat and accordingly form a resilient coupling between the lever and the valve member and that sufficient pressure is exerted against the sliding valve member to facilitate a leak-proof fit within the valve seat and yet will not hamper or retard the operation thereof. On each arm of the U-shaped member are apertured projections to which are attached springs 27, the other ends thereof being secured to hook-like projections 28 on each side of the body portion. The springs 27, with the aid of the spring 25, maintain the sliding valve member in a forward position in the valve seat, which is the closed position of the valve.

A locking device to maintain the valve in an open position is provided on one of the sides of the body portion and comprises a lug 29, a knurled knob 30 and a screw bolt 31 which coordinate to form an abutment, against which, when in operative position, a recessed projection 32, on one of the arms of the U-shaped member, makes contact. In Figure 5 the parts described above are shown in detail, and it will be noted that on the lug 29 there is a projection 33 having ears 34 thereon which extend into recesses 35 on the shank of the knob 30. The lug and knob are held together by and pivoted on the screw bolt 31, and the said lug describes an arc between the stop pin 36 and the recessed projection 32 on one of the arms of the U-shaped member. A suitable aperture is provided in the side of the hood or casing to accommodate the insertion of the knob 30. It will be noted that the rear end of the lug 29 falls into the recess 32 to correctly position the valve member in the valve seat when closed.

In operation the receptacle to be filled will be placed against the curved arms 23 beneath the spout 19. Pressure is then exerted against the receptacle and the actuating lever will be pushed rearwardly, carrying the sliding valve member therewith to the point where the spout will coordinate with the aperture 17 to allow the flow of liquid therethrough. Attention is called to the fact that the spout will follow and be directly over the receptacle at all times during the entire operation of the device so that the possibility of spilling the liquid is eliminated.

A release of the pressure against the actuating lever allows the springs 27 and the spring 25 to return the sliding valve member to its forward and closed position.

If it is desired to maintain the valve in open position the lever is pushed rearwardly and the knob 30 turned so that the end of the lug 29 will abut against the recessed projection 32. By simply turning the knob back the lever will be released and the valve will close.

It will be observed that removal of the stopper in the forward end of the passage 2 gives direct access to said passage for cleaning or sterilizing purposes.

By simply removing the screw bolt 15, the stopper at the forward end of the passage, and the screw bolt 31 and knob 30, the hood or casing can be easily removed to expose the operating parts without any necessity of detaching the device from the container.

It has been found through experiment and actual use of my receptacle actuated faucet that it is leak-proof and that foreign matter will not clog or hinder the operation thereof.

The simplicity, inexpensiveness and attendant advantageous results of the device make it a highly desirable adjunct to the art.

It is understood that there are various modifications and changes which may be made in the invention and structure thereof and which are contemplated to be within the spirit and scope of the appended claims.

I claim:

1. A faucet comprising a body portion having a passage provided with a delivery port, a plate constituting a valve member slidingly mounted on said body portion and controlling the delivery port, a delivery spout on said valve member and manually operable means to actuate said valve member, and a spring in the operating means to retain the valve plate in position.

2. A faucet comprising a body portion having a passage provided with a delivery port, a flat valve-plate slidingly mounted on said body portion and controlling the delivery port, a delivery spout on the plate, a manually operable lever to slide said valve plate, and means to hold said valve plate normally in closed position.

3. A faucet comprising a body portion having a passage provided with a delivery port, a flat plate constituting a valve member slidingly mounted on the lower face of said body portion and controlling the delivery port, a manually operable lever to slide said valve member, and resilient means to hold said valve member normally in closed position, together with locking means to retain the valve in open position.

4. A faucet comprising a body portion having a passage provided with a delivery port, a clean out plug removably mounted in the forward end of the passage, a valve member slidingly mounted on said body portion and controlling the delivery port, a manually operable lever pivotally mounted on the body to slide said valve member, and resilient means connected with said lever to hold said valve member normally in closed position.

5. A faucet comprising a body portion having a passage provided with a delivery port, a valve member slidingly mounted on said body portion and controlling the delivery port, a manually operable lever to slide said valve member, and a resilient coupling between said lever and said valve member.

6. A faucet comprising a body portion having a passage provided with a delivery port, a valve member slidingly mounted on said body portion and controlling the delivery port, a manually operable lever to slide said valve member, and a spring-pressed dog to couple said lever with said valve member.

7. A faucet comprising a body portion having a passage provided with a delivery port, a valve member slidingly mounted on said body portion and controlling the delivery port, a manually operable lever to slide said valve member, and a spring pressed dog carried by said lever to couple said lever with said valve member.

8. A faucet comprising a body portion having a passage provided with a delivery port, a valve member slidingly mounted on said body portion and controlling the delivery port, a manually operable lever to slide said valve member, and a spring-pressed dog housed in said lever to couple said lever with said valve member.

9. A faucet comprising a body portion having a passage provided with a delivery port, a clean out plug removably mounted in the forward end of the passage, a valve member slidingly mounted on said body portion and controlling the delivery port, a manually operable lever to slide said valve member, a resilient means for retaining the valve member in position on the body and means to hold said valve member in open position.

10. A faucet comprising a body portion having a passage provided with a delivery port, a valve member slidingly mounted on said body portion controlling the delivery port, a manually operable lever to slide said valve member, a resilient connection between the lever and the valve member to hold the valve member in position on the body, resilient means to hold said valve member normally in closed position, and means to lock said valve member in open position.

11. A faucet comprising a body portion having a passage provided with a delivery port and having a valve seat on its underside, a slide valve mounted in the valve seat and controlling the delivery port, a delivery spout on said valve, a manually operable lever to slide said valve, means for holding said valve normally in closed position, and exteriorly disposed manually operable means to engage said lever and lock said valve in open position.

12. A faucet comprising a body portion having a through passage provided with a delivery port, a removable closure for one end of said passage, a slide valve mounted on said body portion and controlling the delivery port, means to hold said valve normally in closed position, and a manually operable lever to slide said valve, and further manually operated means to lock the valve in open position.

13. A faucet comprising a body portion having a through passage provided with a delivery port, a removable closure for one end of said passage, a slide valve mounted on said body portion and controlling the delivery port, a delivery spout on the valve, means to hold said valve normally in closed position, and a manually operable lever to slide said valve, the lever moving in unison with the delivery spout.

14. A faucet comprising a body portion having a through passage provided with a delivery port and a slide valve seat, a removable closure at one end of the through passage, a slide valve mounted on said valve seat, a manually operable lever to slide said valve, resilient means to hold said valve normally in closed position, and means to lock said valve in open position against said closing means.

15. A faucet comprising a body portion having a passage provided with a delivery port, a valve member slidingly mounted on said body portion and controlling the delivery port, a lever to actuate said valve member, said valve member and lever moving in the same directions and a resilient connection between the same to retain the valve in position.

16. A faucet comprising a body portion having a passage provided with a delivery port, a valve member slidingly mounted on said body portion and controlling the delivery port, a delivery spout on said valve member, a lever having receptacle receiving means to actuate said valve member, said spout and lever moving simultaneously in the same direction.

17. A faucet comprising a body portion having a passage provided with a delivery port, a valve member slidingly mounted on said body portion and controlling the delivery port, a delivery spout on said valve member, a lever having receptacle receiving means to actuate said valve member, the lower end of the lever moving through an arc longer than the sliding movement of the spout and in the same direction, and the spout being positioned at all times directly over the receptacle to be filled.

18. A faucet comprising a body portion having a passage provided with a delivery port, a valve member slidingly mounted on said body portion and controlling the delivery port, a delivery spout on said valve member, a lever having receptacle receiving means to actuate said valve member, the lower end of the lever moving through an arc longer than the sliding movement of the spout and in the same direction, and the spout being centrally positioned at all times directly over the receptacle to be filled and means for locking the valve and spout in open position.

19. A faucet comprising a body portion having a passage provided with a delivery port, a casing for said body portion, a valve member slidingly mounted on said body portion and controlling the delivery port, and manually operable means to slide said valve member and means passing through the casing to lock the valve in open position.

20. A faucet comprising a body portion having a passage provided with a delivery port, a removable casing for said body portion, a valve member slidingly mounted on said body portion and controlling the delivery port, and manually operable means to slide said valve member and means passing through the casing to lock the valve in open position, said means comprising a screw stem on the body, a lug rotatable on the stem, and a knurled knob rotatable on the stem and connected to the lug for manually moving the same.

In testimony whereof I have hereunto set my hand.

IVAR W. WATERVAL.